US011682252B1

(12) United States Patent
Nuccio

(10) Patent No.: US 11,682,252 B1
(45) Date of Patent: Jun. 20, 2023

(54) VEHICLE SAFE WITH REMOTE ACCESS CONTROL

(71) Applicant: Edward F. Nuccio, Modesto, CA (US)

(72) Inventor: Edward F. Nuccio, Modesto, CA (US)

( * ) Notice: Subject to any disclaimer, the term of this patent is extended or adjusted under 35 U.S.C. 154(b) by 0 days.

(21) Appl. No.: 17/931,666

(22) Filed: Sep. 13, 2022

(51) Int. Cl.
G07C 9/00 (2020.01)
B60R 25/24 (2013.01)
B60R 7/00 (2006.01)

(52) U.S. Cl.
CPC .......... *G07C 9/00912* (2013.01); *B60R 25/24* (2013.01); *B60R 7/00* (2013.01)

(58) Field of Classification Search
CPC ........ G07C 9/00912; B60R 25/24; B60R 7/00
See application file for complete search history.

(56) References Cited

U.S. PATENT DOCUMENTS

| 4,897,644 | A | 1/1990 | Hirano | |
|---|---|---|---|---|
| 6,386,007 | B1 | 5/2002 | Johnson | |
| 6,409,064 | B1 | 6/2002 | Bayley | |
| 7,897,888 | B2 | 3/2011 | Dimig | |
| 8,038,195 | B1 * | 10/2011 | Hutcheson | B60R 9/00 296/136.04 |
| 8,487,743 | B2 | 7/2013 | Proefke | |
| 8,869,576 | B2 | 10/2014 | O'Leary | |
| 9,305,410 | B2 | 4/2016 | Lickfelt | |
| 9,738,232 | B1 * | 8/2017 | Hill | B60R 11/00 |
| 10,525,892 | B2 | 1/2020 | Gargano | |
| 10,538,220 | B1 | 1/2020 | Tyagi | |
| 10,871,023 | B1 * | 12/2020 | Goetz | G06Q 20/127 |
| 10,891,814 | B2 | 1/2021 | Briskey | |
| 2007/0159297 | A1 | 7/2007 | Paulk | |
| 2007/0227866 | A1 | 10/2007 | Dimig | |
| 2008/0196637 | A1 * | 8/2008 | Howell | E05G 1/005 109/38 |
| 2009/0217714 | A1 | 9/2009 | O'Leary | |
| 2010/0039215 | A1 | 2/2010 | Proefke | |
| 2013/0033361 | A1 | 2/2013 | Lickfelt | |
| 2013/0055933 | A1 * | 3/2013 | Markman | E05G 1/005 29/525.01 |

(Continued)

FOREIGN PATENT DOCUMENTS

DE 10025094 11/2001
DE 102007014178 9/2008

(Continued)

*Primary Examiner* — Thomas D Alunkal
(74) *Attorney, Agent, or Firm* — O'Banion & Ritchey LLP; John P. O'Banion

(57) ABSTRACT

A remote access locking system and transportable secure containers are provided with a wireless key fob and optional tamper alarm, location transponder and reversible coupling to secure the container to a vehicle element or to a mounting plate that is fixed to the vehicle. The wireless fob sends wireless command signals to a controller that authenticates the signal and locks or unlocks the container door. The controller may also have a sound generator configured to produce a characteristic chirp when the lock is locked or unlocked by the controller that is different from the vehicle door chirp. The wireless fob for the container may stand alone or have a coupling joining the container fob with a conventional wireless entry fob for a vehicle. The system may also use secondary security measures such as RFID tags for two step authentication.

20 Claims, 7 Drawing Sheets

(56) References Cited

U.S. PATENT DOCUMENTS

| | | | |
|---|---|---|---|
| 2018/0274281 A1* | 9/2018 | Bernkrant | F41C 33/029 |
| 2019/0139337 A1 | 5/2019 | Briskey | |
| 2019/0152401 A1 | 5/2019 | Gargano | |
| 2019/0176675 A1* | 6/2019 | Lysik | B60P 3/03 |
| 2021/0293075 A1 | 9/2021 | Oesterling | |

FOREIGN PATENT DOCUMENTS

| | | |
|---|---|---|
| DE | 102008059246 | 5/2010 |
| DE | 102014000482 | 8/2014 |
| EP | 1800975 | 6/2007 |
| EP | 2280405 | 2/2011 |
| KR | 101428887 | 9/2014 |
| KR | 1020120105946 A | 9/2021 |

* cited by examiner

VEHICLE SAFE WITH REMOTE ACCESS CONTROL

CROSS-REFERENCE TO RELATED APPLICATIONS

Not Applicable

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to secure lock box systems and methods for locking containers and more particularly to a locking safe with remote access that can be reversibly coupled to a vehicle mounted baseplate or permanently mounted to a vehicle structure.

2. Background

Cellular telephones, tablets, laptop or conventional computers, music performance devices, instruments and other electronic devices are common items of significant value that have become the typical targets of vehicle break-in's along with wallets, purses and expensive sunglasses that have been left in plain view or hidden in the interior of the vehicle. Unfortunately, a vehicle driver does not normally have a secure place to deposit these expensive items that is easily accessible, secure and will deter an attempted theft because of the absence of any visibly obvious and valuable contents in the interior of the vehicle to steal.

Most modern vehicles are equipped with at least one locking compartment such as a glove compartment, center console or trunk interior compartment to protect valuables. These locked compartments are typically locked or opened with the standard metal vehicle key. The locked trunk of the vehicle, however, may be accessed by a release lever or button located in the interior of the vehicle that is not secure limiting the security of items within the trunk. Furthermore, many increasingly popular vehicles such as Sport Utility Vehicles (SUVs) and trucks are at a greater risk of break-in's and theft than automobiles by not having a secure place for valuables like a trunk for conventional safes or strong boxes.

While locked compartments provide some protection, the compartments are not made from strong materials and are not resistant to breach by levers overcoming the locking mechanism or by destruction of one of the walls of the compartment. Because most automobiles have a readily accessible and unlockable trunk release button or lever inside of the vehicle allowing easy access to the trunk, all of the valuables contained therein are exposed to theft without the need of breaking the trunk lock. In addition, locked compartments within the vehicle cannot be removed from the vehicle and delivered to a building or exchanged between vehicles.

Locked containers such as strong boxes, chests and safes that are fitted with keyed locks, chains, cables, bolts or other locking mechanisms to secure valuables have been developed over the centuries. These secured containers are designed to function as theft deterrents making it difficult for unauthorized people to gain access to important items such as currency, jewelry, firearms and valuable papers and other important valuables. Locked containers may be portable and easily accessible, or they may be permanent or semi-permanent enclosures, depending on their size, because of the bulk and weight of the materials that are used to make the container.

Vehicle mounted lock boxes have been developed to provide secure storage of valuables during short term transport between locations. Transportation of large sums of currency or business receipts by company employees or by individuals may expose the driver to an attempted theft by an assailant. The possibility of a theft attempt or crisis situation may be the cause of significant anxiety in the driver.

Secure storage of potentially harmful items such as firearms or knives within a vehicle is an additional safety precaution to prevent unauthorized access and such precautions may be necessary to comply with governmental control ordinances. Such containers are superior to locked trigger guards that do not conceal the firearm from view from a child or a thief that may see the firearm as a target for a break-in.

Although conventional safes or strong boxes may provide some security for valuables within a vehicle and allow portability, they can be easily removed by thieves and may inadvertently become targets. The snatched safe can then be opened by thieves at a different location with ample time using specialized tools.

Accordingly, there is a need for a transportable vehicle safe that is secure and easy to access by the user but is difficult to open by children and other unauthorized persons and is difficult to extract from the vehicle by thieves. There is also a need for a safe that can be readily transported between locations and interchangeable with other vehicles.

BRIEF SUMMARY

Secured containers with remote opening systems and reversible mounting systems are provided that are very resistant to detachment and breach. The containers are easily accessible to authorized users through the use of a wireless actuator, preferably in the form of a fob coupled to a conventional fob that provides keyless entry to a vehicle.

The general purpose of the unique access safes is to deter and prevent theft of valuables or the container when the vehicle is left unattended during relatively short-term everyday circumstances, like parking at a hotel overnight, a restaurant, a movie theatre, a concert, professional or family related sporting events, a day at the beach, parked while out jogging or riding a bicycle, and similar outdoor activities. The safe can also be removed from the vehicle and stored in a building or used to securely deliver valuables in the safe from point to point.

The vehicle safe is preferably a container made of a material such as plate steel that is extremely difficult to break or bend while secured to the vehicle. In one embodiment, the vehicle safe has a recessed door with hidden or interior hinges and at least one manually operated backup locking mechanism, in addition to a remote locking mechanism that is normally used to open the vehicle safe. The recessed door makes it difficult to insert a lever to attempt to pry open the door.

The vehicle safe container also has a system for coupling the container to a section of floor or wall of the vehicle. In one embodiment, the vehicle safe is coupled to a securely welded steel plate that has been mounted to the vehicle at the factory or by a dealer. The steel plate preferably accommodates four pre-aligned locations for fasteners such as wing-nut bolts to attach the safe to the vehicle. The safe is mounted to the vehicle with bolts passing through aligned holes in the bottom of the safe that are only accessible from the interior of the safe. In another preferred embodiment, the bolts are placed through holes in the safe bottom and into threaded holes in the mounting plate. The bolt heads are only accessible from the interior compartments of the safe.

Preferably, the four bolt locations on the steel plate are standardized and the corresponding holes in the bottom panel of each different sized safe will also be standardized so that the safe can be mounted in any vehicle that is equipped with a mounting plate. This allows the safe to be easily removable and interchangeable between family and business vehicles or locations for added convenience and lower cost to the consumer because there is no need to purchase of more than one safe.

Additionally, the standardized four bolt locations will allow the flexibility of mounting the vehicle safe in a preferred orientation (i.e., forward and backward, or side to side) to allow more storage flexibility inside of the vehicle. In another embodiment, the container may be reversibly coupled to a steel plate of a vehicle with a mechanism that can be actuated remotely to separate the safe from the vehicle such as with solenoid driven pins or latch.

For new vehicles, the mounting plate may be originally installed at the factory, or as an after-market addition installed at a dealership thereby allowing the steel mounting plate to be retrofitted to any vehicle at a convenient location in the interior of a vehicle.

In one embodiment, the trunk or rear hatch area of an SUV or truck that typically has carpeting will have an access "flap" of carpet installed that is configured to fold down and cover the mounting plate in the absence of the safe so that other items in the trunk will not get scratched or damaged by rubbing against an exposed metal mounting plate. The flap of carpet may be part of the vehicle carpet that can be lifted up to expose the mounting plate or it can be a detachable protective carpet square or pad utilizing hook and loop fasteners, snaps or similar attachment mechanisms that allows the carpet or pad to securely cover the mounting plate.

The mounting plate is preferably sized to accommodate vehicle safe containers of a variety of shapes and sizes that are configured with a universal coupling system. Therefore, dimensions of the vehicle safe can be selected for accommodating common valuable items of different sizes or specific business items of value to be secured and transported in a vehicle. Small to large safes of different shapes and profiles can be coupled to the universal mounting plate and are interchangeable.

For example, the container may be sized to have enough room to contain a laptop computer, a purse, a backpack, a handgun and purchased items of value within a reasonable size range. Alternative safe containers may also be sized to accommodate specific items of different sizes, such as, golf clubs, shotguns or rifles, and any other valuable items of characteristic sizes.

Alternative safe containers may also be sized or partitioned for specialty items such as a handgun that is separated from ammunition in the interior of the safe by a partition. Such secure storage enclosures presented here are superior to locked trigger guards that do not conceal the firearm from view by a child or other persons that may be unintentionally placed in danger or to a thief that may see it as a target for a break-in.

The locked safe would also provide a secure area to legally transport or store "open container" bottles of alcohol, legalized and prescription drugs or permitted weapons while traveling.

Accordingly, a user could purchase more than one interchangeable safe of different sizes to accommodate their specific needs. Container sizes may also be determined by available space and locations within a vehicle for placement of a mounting plate and safe. Multiple mounting plates can also be installed in a vehicle. Readily available container sizes may also be determined by consumer surveys and/or demand that will afford the owner unprecedented and flexible vehicular security.

Small containers may be used that are sized for small electronic devices, valuable sunglasses, wallets, watches, jewelry, or cash, etc. These smaller items can also be more securely contained within a larger sized safe by an easily removable and partitioned insert, container or compartment within the safe. For example, a smaller sized container may be about 16 inches wide by about 18 inches long and have a 10 inch inside depth. A larger safe to fit a few large purses and other larger items may have dimensions that are approximately 16 inches wide by 18 inches long and a 16 inch inside depth. A very large safe could also be about 12 inches wide by up to 36 or 48 inches long and a 14 inch inside depth for golf clubs, or shotguns and rifles, respectively. Although safe containers of these specific sizes are used to illustrate some preferred safe container sizes, it will be understood that the locking mechanism can be used with safes of any size or shape.

Access to the vehicle safe is preferably controlled remotely by a fob so that the safe will be locked and unlocked by a programmed "key" that is actuated by the user in proximity of the safe locking mechanism. In one embodiment, a second radio frequency tag or chip must also be in proximity to the lock to provide a two-stage security system. If the frequency control of the programmed "key" is duplicated or defeated, the absence of the second RFID security tag will stop the safe from being opened, for example.

In another embodiment, the safe fob with lock and unlock keys may also have mount and dismount keys or buttons for locking and releasing the vehicle safe to the mounting plate. This embodiment allows for a quick release and removal or quick mounting of the safe with the vehicle with a button. This allows settings where the safe is mounted, transported, and removed from the vehicle without the need to open the safe. Here, the driver may not have access to the contents of the safe during transport or during a robbery. This may insulate the driver from responsibility for losses from a robbery or theft attempt in a commercial setting.

The vehicle safe fob and the door locking and unlocking fob functions for the vehicle may be separate or may be combined. In one preferred embodiment, the locking switches to the safe are present on a separate and easily removable remote portion reversibly mounted at the top of a regular vehicle keyless remote. For example, the portion of the fob for the safe can be removed to deny access to the safe when valet parking at a restaurant or overnight parking at a hotel. Thereafter, the two portions of the combined fob can later be reunited so that access to the vehicle and the safe can be controlled from one combined device.

In another embodiment, the safe locking mechanism or the fob makes a chirp or other auditory signal that the safe is locked or unlocked. Alternatively, the safe controlling part of the key fob would make the vehicle give a different chirp sound confirming the safe is locked from that made when the vehicle doors are locked or unlocked. Here, the user will have a specific sound confirmation that the safe and the car are individually locked or unlocked and will be confident that the vehicle and valuables are secure.

As a backup accessibility feature, the safe may also have a locking mechanism with conventional numbered manual push buttons on the face of the safe to be opened manually if the remote fails for any reason to operate the safe correctly. The owner therefore cannot be locked out of the safe as long as there is trunk and/or vehicle interior accessibility.

In another embodiment, the wireless actuation of the safe lock is controlled by a cellular telephone or independent handheld controller. The cellular telephone and safe communicate over conventional cellular communications networks to provide backup access or provide an additional security feature.

The safe should also provide excellent theft protection even if someone has access to the inside of the trunk because the limited space within the trunk prevents the use of adequate leverage for removal, or attempted destruction of the safe. This feature provides an added deterrent against the theft of the contents of the safe because of the obvious difficulty in forcibly removing the safe from the vehicle in a short period of time.

In another embodiment, the safe also includes a location transponder, GPS transponder or other tracking system located inside of the safe. This location tracker will transmit the location of the safe as well as the vehicle across cellular telephone, GPS or other communications systems so that the vehicle and safe can be quickly located if the vehicle is stolen or attacked.

In this embodiment, the safe locking mechanisms, alarms and trackers also have an auxiliary power source such as a battery pack or a rechargeable battery pack or other auxiliary power supply. The safe and these auxiliary power sources may be connected to vehicle power sources and will provide power to the safe systems if the vehicle power is disconnected for a period of time. This allows all of the safe systems to operate and transmit even if the external power is lost or intentionally cut. Auxiliary power will permit the GPS/tracker to operate longer after the loss of power to improve the chances for recovery of a stolen vehicle or safe with an active tracker. Auxiliary power will also allow the fob initiated locking mechanism and other security measures to remain active.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, devices, systems and methods for remote access reversibly secured vehicle safes are generally shown. Several embodiments of the technology are described generally in FIG. 1 through FIG. 11 to illustrate the characteristics and functionality of the devices, systems and methods.

It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
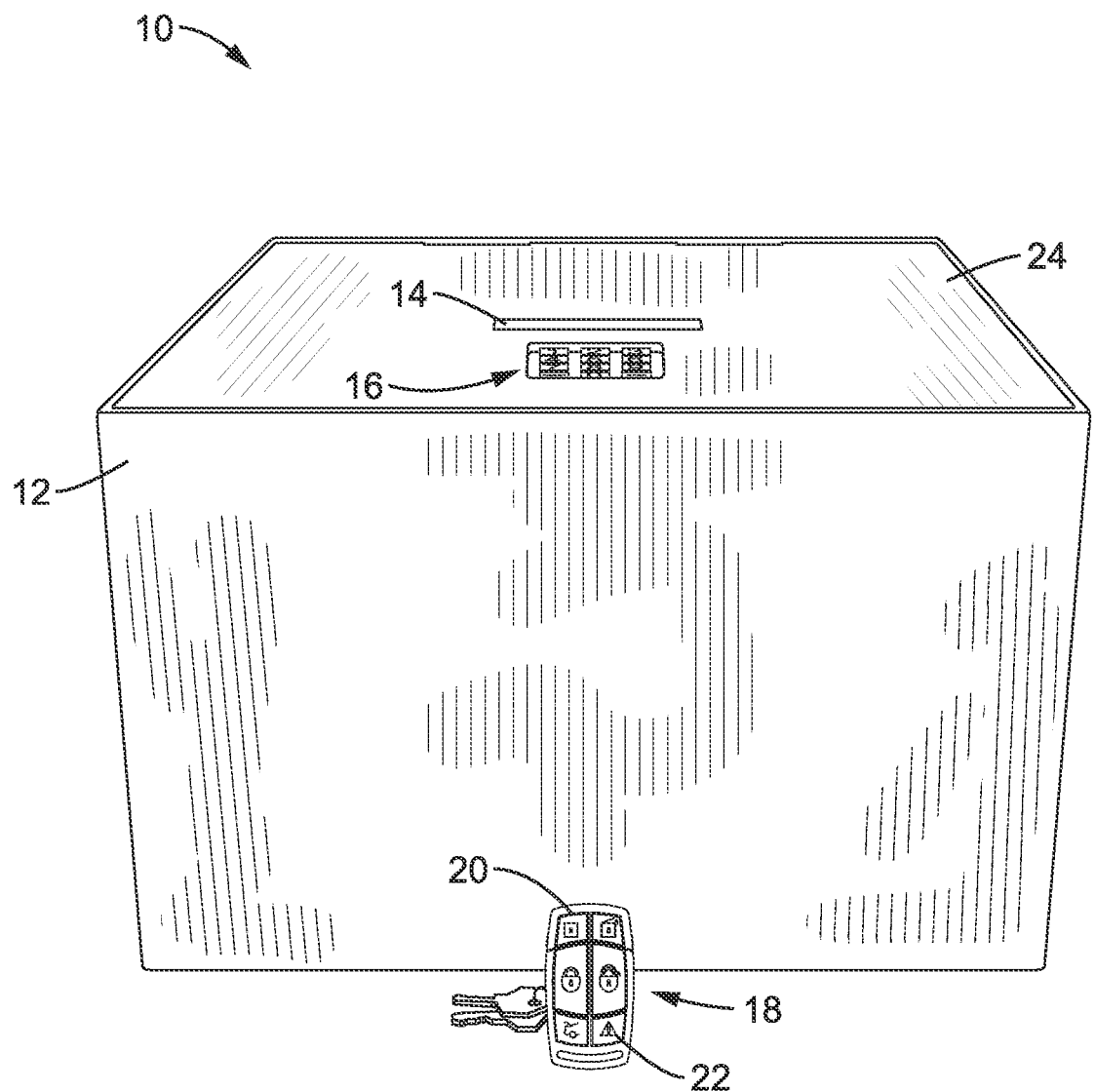
FIG. 1 is a front perspective view of a remote access secured container and combination safe lock and vehicle lock fob according to one embodiment of the technology.
Figure 2:
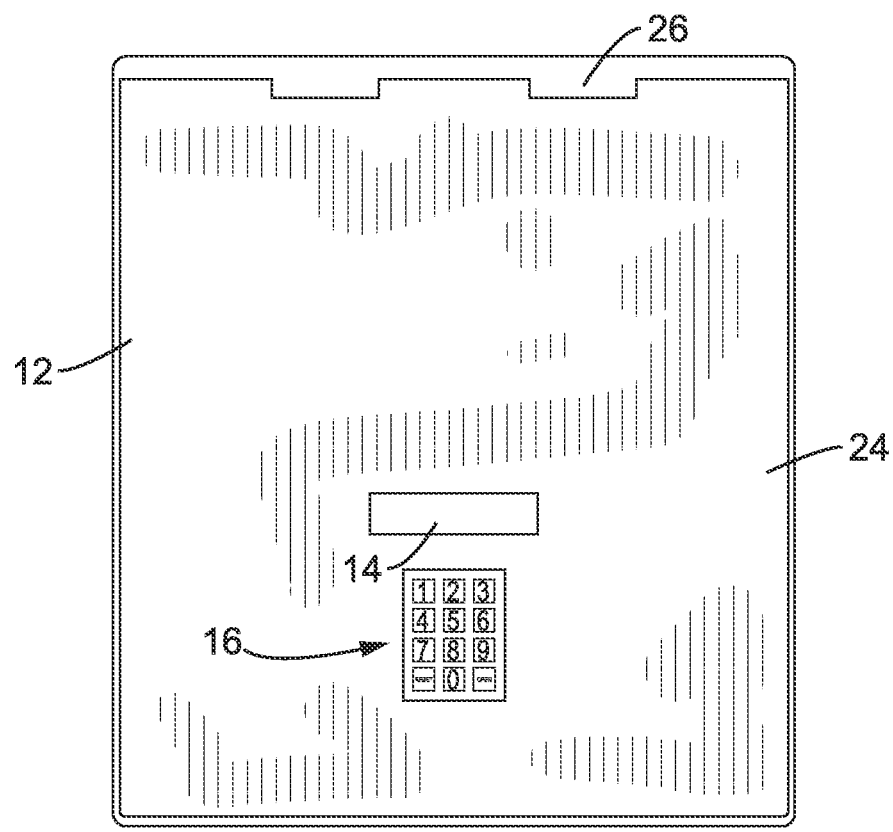
FIG. 2 is a top view of the secured container embodiment shown in FIG. 1 showing handle and keypad features.

Turning now to FIG. 1 and FIG. 2, one embodiment 10 of a remote access secured container and remote locking control fob are shown schematically. The secured container apparatus and system 10 has a container 12 with a hinged lid 24 that can be manually closed and locked with a locking mechanism 16. In the embodiment shown, the hinged lid 24 has recessed hinges 26, at least one handle 14 for ease in opening the lid 24 as well as in lifting and transporting the container to and from the vehicle. In another embodiment, the lid 24 has vertical edges that overlap the walls of the top edges of the walls of the container 12.

The lid locking mechanism 16 is preferably actuated to lock or unlock the lid by a wireless device 18 such as a fob. In the event of a failure of the wireless device 18, the locking mechanism 16 optionally includes a keypad or similar access scheme associated with the locking mechanism 16 to allow manual access to the container 12. In this embodiment, the locking mechanism 16 can also be locked or unlocked manually if the wireless device 18 is lost, misplaced, absent, damaged or if the wireless actuated locking mechanism 16 of the device is inoperable.

In a preferred embodiment, a combined fob wireless device 18 is provided that is a safe fob 20 coupled to a conventional vehicle fob 22 so that the user has control over access to the vehicle as well as the safe with one access device 18. In another embodiment, the fob wireless device 18 is a single fob with both safe locking and unlocking and vehicle locking and unlocking functions in one device 18 that does not have separable components.

As seen in FIG. 2, the container lid 24 is recessed within the top edges of the vertical walls of the container 12 and the hinges 26 are also recessed to make it difficult for a thief to quickly breach the lid of the safe with a prying tool.

Figure 3:
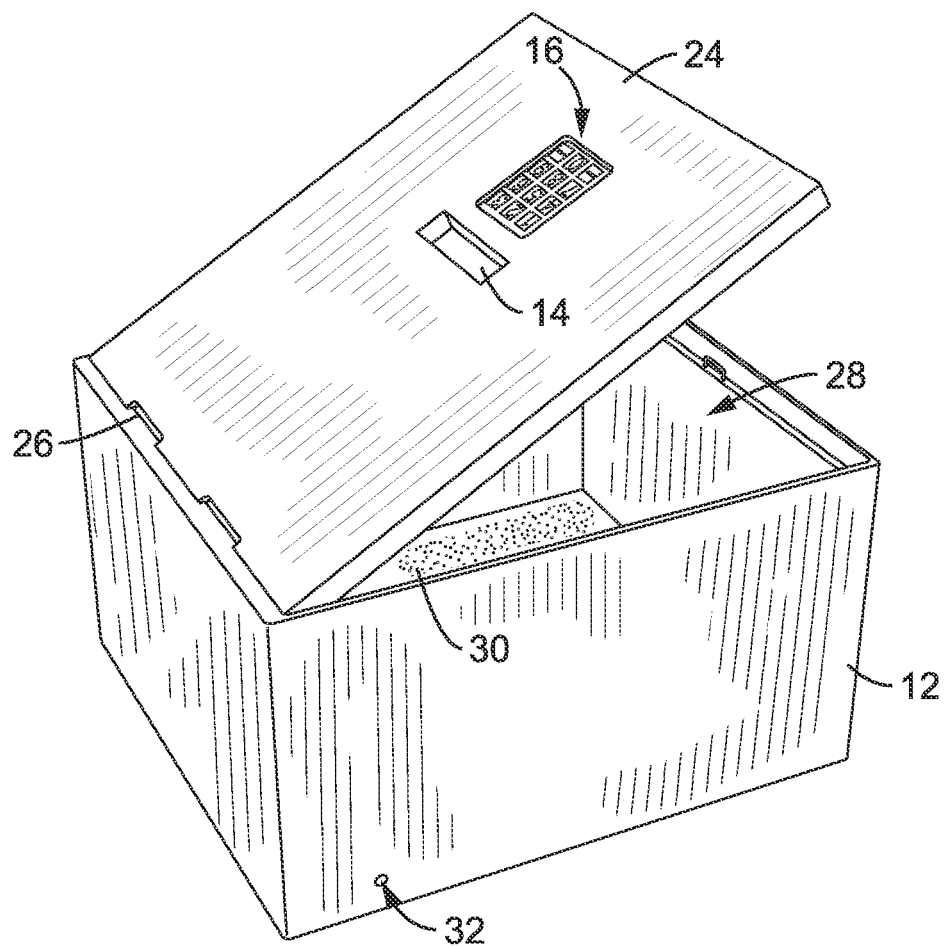
FIG. 3 is a side perspective view of the secured container of FIG. 1 with the door partially open to reveal the interior of the unlocked container.

Deactivation of the locking mechanism 16 with the signal from the safe fob 20 of the combined fob wireless device 18 allows the lid 24 to be opened and permits access to the interior 28 of the container 12 as shown in FIG. 3. Deactivation of the locking mechanism 16 may alternatively be accomplished with the manual entry of a code or combination on the keypad in this embodiment.

Figure 4:
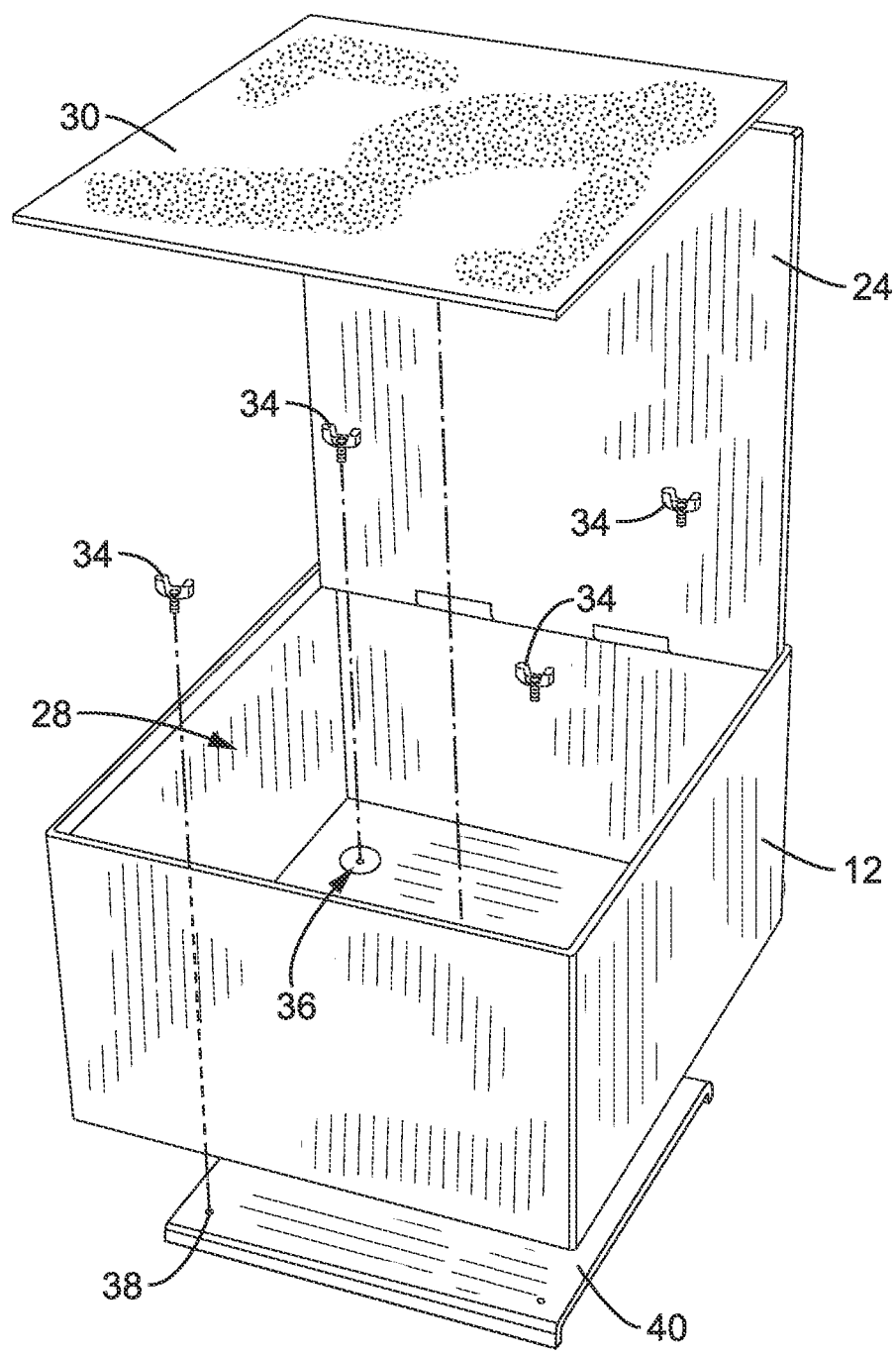
FIG. 4 is an exploded perspective view of the open container embodiment shown in FIG. 1 showing the anchor plate, open container wingnut bolts, and internal pad to be placed over the wingnut bolts and the bottom of the container to providing a smooth, flush, level surface on which to place items.

As seen in FIG. 3 and FIG. 4, an optional pad 30 may be placed at the bottom of the container to provide a smooth flush surface over the mounting wingnut bolts 34 type fasteners to safely and securely prevent any damage to transported items within the safe. The interior of the container 12 may also be partitioned into sections or chambers.

In some embodiments, a power access port 32 is provided that can be connected to a power source from the vehicle or independent source to charge batteries or function as a continuous source of power for the locking mechanism and optional container docking mechanism. The power access port 32 and/or rechargeable batteries may also provide power for secondary security measures such as optional tamper alarms that will go off independently if there is an attempt to detach the safe or to breach the door of the safe while in the locked state. The batteries or continuous power source may also power secondary authentication features such as biometric scanning, RFID readers, cellular phone codes or similar features.

Other powered features may include a communications link with Bluetooth or cellular phone transmitters and receivers. In one embodiment, the system includes a location transponder to track the safe if it becomes separated from the vehicle or otherwise monitor the location of the safe over time. The auxiliary power source will maintain the tracking transmissions and other safe security functions if the vehicle power is lost or cut or if the safe is removed. This power feature will also allow tracking of a stolen vehicle containing a safe even if the vehicle power is cut. The location may be transmitted to a cellular phone or a monitoring station.

The secured container 12 is preferably reversibly coupled to a vehicle with a mounting plate 40 that has been welded to the structure 44 of the vehicle or other permanently mounted platform. In the embodiment shown in FIG. 4 and FIG. 5, the mounting plate 40 is smaller than the bottom of the container 12 and the mounting plate 40 fits in a recess in the bottom surface of the container 12 so that the container bottom is flush with the floor or wall of the vehicle when coupled with the mounting plate 34. Since the bottom of the container 12 is flush with the floor of the vehicle and overlapping the mounting plate 40 when mounted, it is difficult to insert a crowbar or similar tool under the container edge to exert any leverage and therefore deters and prevents theft of the entire container 12.

In another embodiment, the mounting plate 40 can be larger than the outer perimeter of the container 12 so that the plate 40 can accommodate containers of different sizes and shapes with a firm base. In this embodiment, the bottom edges of the container fit tightly against the welded mounting plate 40 and is flush with the floor making it difficult to insert a lever between the container and the mounting plate 40.

As shown in the exploded view of FIG. 4, in one embodiment, the container 12 is coupled to the mounting plate 40 with threaded bolts 34 with wingnut heads that are only accessible from the interior 28 of the container when the safe is open. Each wingnut bolt 34 is directed through one of the four preferably recessed openings 36 in the bottom of the container 12 and into corresponding threaded holes 38 in the mounting plate 40 and then tightened to securely seat and attach the container 12 to the welded mounting plate 40. In one embodiment, the heads of the bolts 34 are countersunk so that they are flush with the bottom surface of the interior 28 of the container 12. Pad 30 may then be placed over the bolts 34 and the bottom of the container 12 to provide a smooth and soft interior surface to place items.

Although a simple coupling scheme using bolts is used to illustrate reversible coupling of the container with the mounting plate, it will be understood that other mechanical or electrical approaches known in the art for joining components can be used. For example, solenoid driven pins, sockets, latch bolts, slide bolts and similar approaches can be used to anchor the container 12 to the mounting plate 40. In one preferred embodiment, the coupling of the container 12 to the mounting plate 40 can be remotely activated and deactivated with a wireless signal from a fob.

The vehicle safe can be placed at various locations within the interior or trunk of a vehicle for convenient access and use. It can be seen that one or more additional mounting plates with the four universally identical wingnut bolt locations to accommodate safes of different sizes can be placed in different locations in the vehicle. The additional plates may be installed in the vehicle at the factory or installed after purchase by a local dealership if so desired by the owner of the vehicle.

Figure 5:
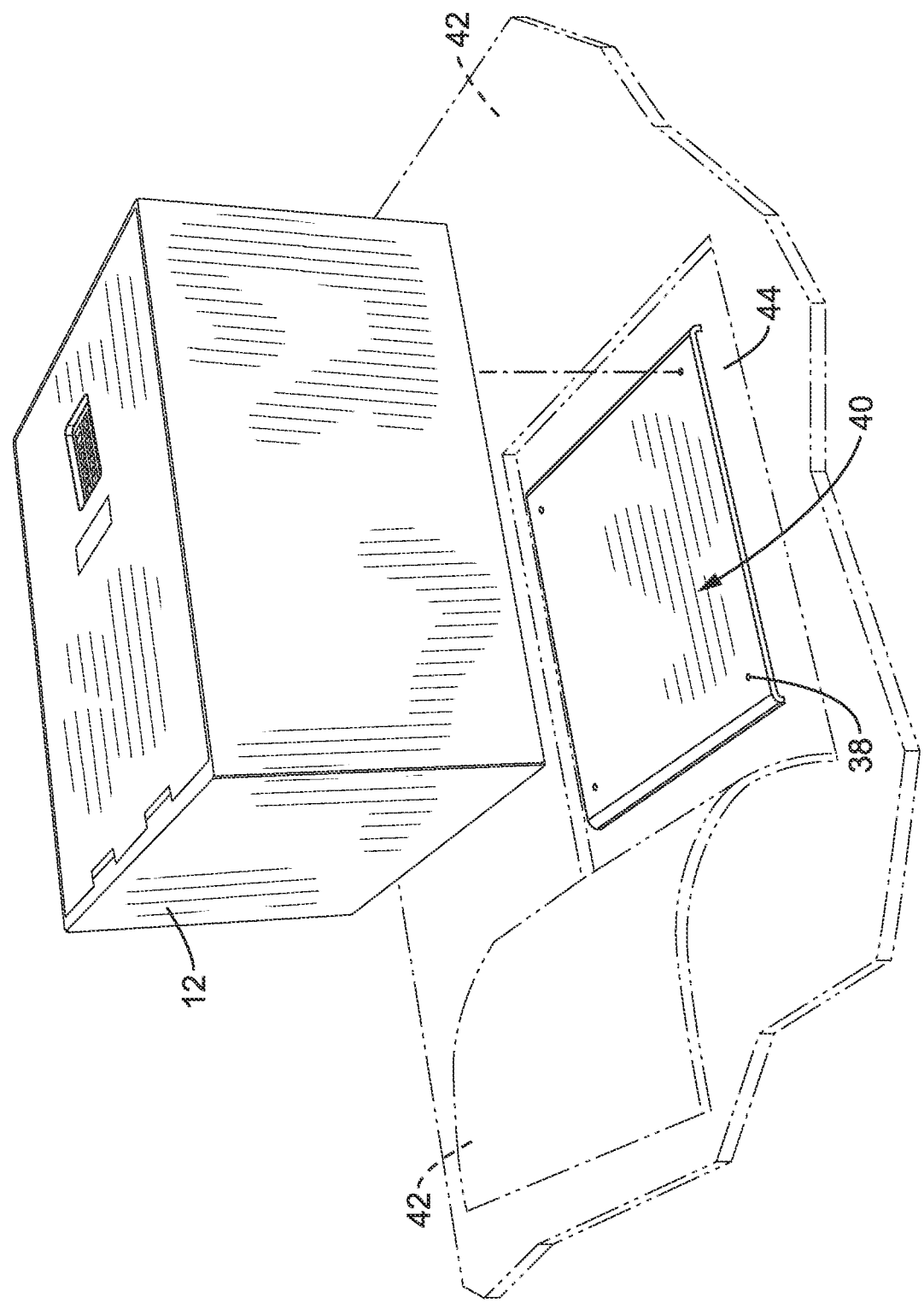
FIG. 5 is a side perspective view of the anchor mounting plate welded to the vehicle in an opening in the vehicle carpet with a carpet flap configured to cover the mounting plate when the safe is decoupled and removed from the vehicle.
Figure 6:
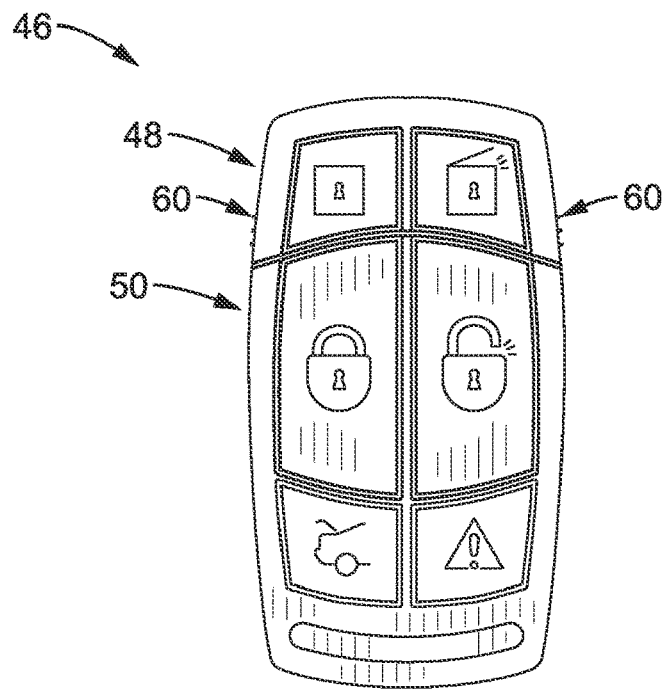
FIG. 6 is a front view of a combination safe lock and vehicle lock fob according to one embodiment of the technology.

In Sport Utility Vehicles (SUVs) that do not have a trunk compartment, the safe 10 may be placed behind the front or rear seats or in areas that are typically reserved for cargo. These cargo areas are normally metal floor structures covered in carpet. As illustrated in FIG. 5, the mounting plate 40 may be welded to an exposed metal floor structure 44. The existing floor carpet inside of the trunk of the vehicle may be cut on three sides to create a flap 42 that can be folded back over the mounting plate 40 when the vehicle safe 12 is removed from the vehicle to provide a cover for the mounting plate 40. The carpet flap 42 is present to protect both the mounting plate 40 as well as any cargo that may be damaged by contact with the plate 40 when the safe is absent. In another embodiment, the protective covering for the mounting plate 40 is a detachable protective carpet square or pad utilizing hook and loop fasteners, snaps or other types of fasteners to secure the pad over the mounting plate 40.

Access to the vehicle safe 10 is preferably provided by a wireless signal to the safe locking mechanism 16 to lock or unlock the lid 24 of the safe. The signal could be generated from a variety of sources within the context of the secured container system. For example, the signal may be generated with a smartphone interface through a communications link that is part of the locking mechanism 16 within the container 12. The smartphone interface of the locking mechanism 16 could also be used to activate or deactivate alarms, transponders, or show current location or other functions as well as provide authentication as a secondary security measure. In one embodiment, for example, a cellular telephone link with the safe is used to transmit a control command to the safe locking mechanism 16 to unlock the safe directly if the fob is lost or disabled or may transmit an authorization code to the safe before opening as a secondary security feature.

The signal or signals to the locking mechanisms of the secured container could also be generated by a RF remote fob 46. As illustrated in the embodiment shown in FIG. 6 and FIG. 7, the frequency generator for activating the locking mechanism for the vehicle safe is part of a wireless remote 48 that is integrated with a keyless entry remote 50 for the vehicle.

Figure 7:
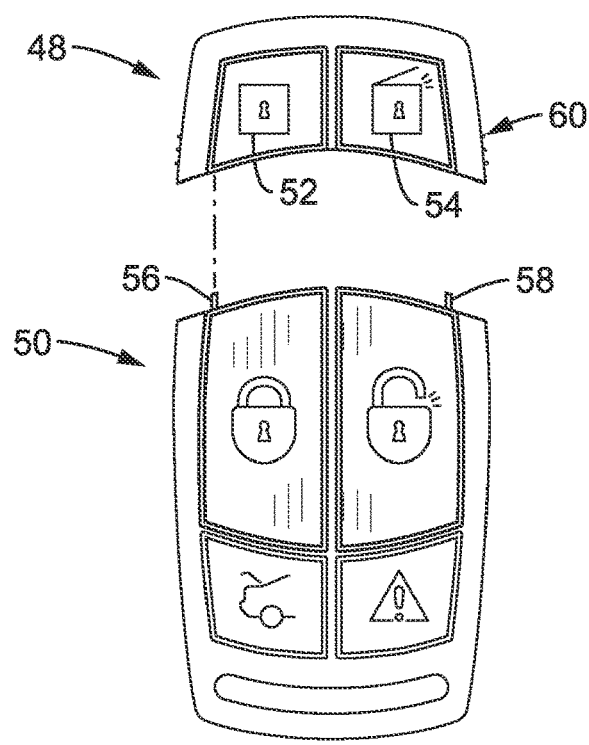
FIG. 7 is an exploded front view of the combination fob shown in FIG. 6 with the safe access fob separated from the vehicle door opening fob.

The safe remote portion 48 of remote fob 46 has a safe locking button 52 and a safe opening button 54 as shown in FIG. 7. In one embodiment, other buttons such as safe uncoupling buttons to actuate a mechanism for separating the safe from the mounting plate 34 may also be included in the safe remote 48. The safe remote 48 may be independent of the keyless entry remote 50 for the vehicle or may be coupled to it. In the embodiment shown in FIG. 6 and FIG. 7. The safe remote 48 is connected to the keyless entry remote 50 with two connectors. In the embodiment shown in FIG. 7, the left connector 56 and right connector 58 are loops that fit into corresponding sockets within the body of the safe remote 48 and thereby retained. The safe remote 48 can be separated from the vehicle keyless entry remote portion 50 by pressing release buttons 60 on either side of the safe remote and pulling the two remotes apart. This feature, for example, allows the vehicle remote portion 50 to be left with a valet or at a repair facility while the safe remote portion 48 is kept with the user thereby providing security for the safe.

The secured container 12 can be sized and shaped to hold items of characteristic sizes and shapes or fit in a specific location or locations in the vehicle attached to the specific mounting plate or multiple plates 40 using identical four wingnut bolts 34. Typically, the secure container or containers will be box shaped with multiple size options that are available from a manufacturer in pre-determined sizes. The customer can select a safe container that provides an interior space of suitable size to contain common valuables such as standard prescription eyeglasses or sunglasses, money, or other valuable or confidential papers containing sensitive identity information, a laptop or conventional computer, purses, a backpack, multiple handguns, golf clubs, shotguns or rifles, and any other purchased items of value within a reasonable size range.

The vehicle safe 10 may also have an optional protective cover 62 with a bottom opening that can slip over the top door and sidewalls of the safe. The protective cover 62 is preferably made of a soft material that protects the safe from impacts during normal use of the vehicle. The protective cover 62 may also protect vehicle occupants or cargo from damage from an impact with the corners of the safe.

Figure 8:
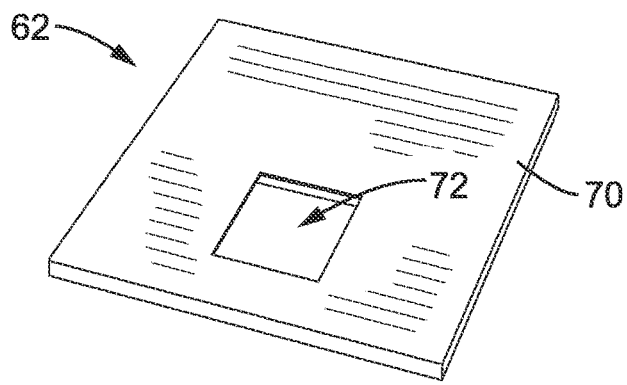
FIG. 8 is a top perspective view of a collapsible protective cover in a fully collapsed state according to one embodiment of the disclosed technology. The easily stored and collapsible folding container cover is used to prevent damage like scratching or denting other vehicular contents as a result of impacts with the safe.
Figure 9:
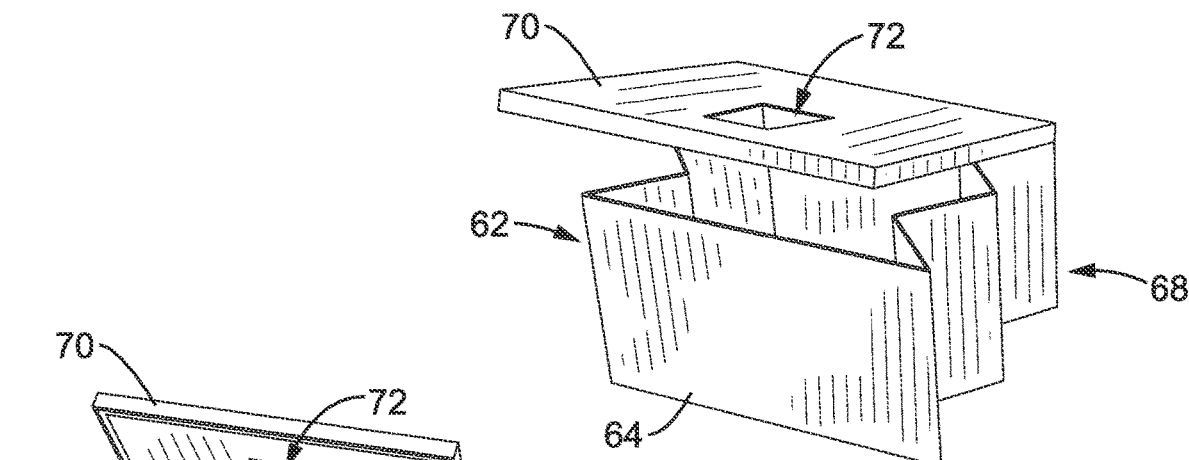
FIG. 9 is a perspective view of the collapsible protective cover of FIG. 8 in a partially collapsed state showing opposing accordion sidewalls and hinged top with access opening.
Figure 10:
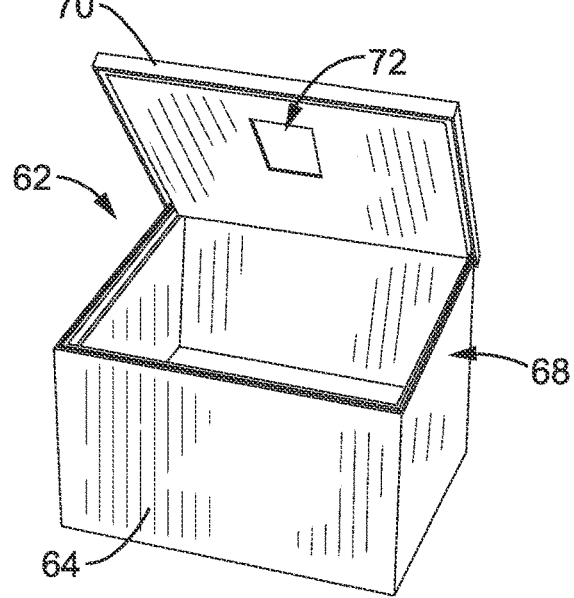
FIG. 10 is a perspective view of the collapsible protective cover of FIG. 8 in a fully expanded state showing an open hinged top.
Figure 11:
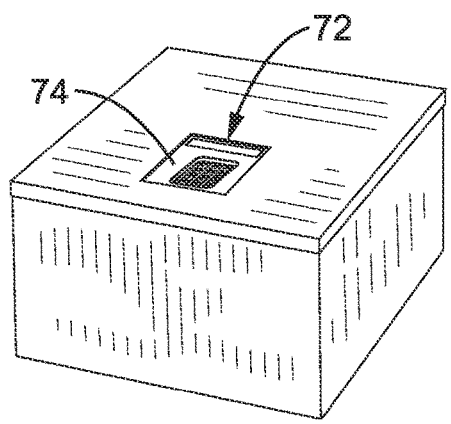
FIG. 11 is a perspective view of the collapsible protective cover of FIG. 8 placed over a vehicle safe showing access to the keypad through the access opening in the hinged top of the cover.

One embodiment of soft collapsible cover 62 for the vehicle safe is shown in FIG. 8 through FIG. 10 in shown in different stages of expansion and in place on a safe in FIG. 11. The container cover 62 embodiment shown in FIG. 8 is in the fully collapsed form with the walls folded under the top lid 70 thereby making the cover completely collapsible taking up very little vehicle storage space. The top of the cover in this embodiment has an opening 72 to allow access to the keys of the keypad 74 when the cover 62 is placed over the top of the safe 12.

As shown in the partially expanded state of FIG. 9, the cover 62 has two opposing rigid sides 64 (front and back) and two opposing accordion folding sides 68 (left and right), a top panel 70 and an open bottom section that receives the structure of the safe when in use. The front and back rigid sides 64 collapse or expand towards each other as the left and right accordion sides 68 fold or unfold.

When the accordion sides are fully unfolded, as seen in FIG. 10, the cover 62 is ready for placement over the vehicle safe as shown in FIG. 11. The cover 62 also has the benefit of disguising the identity of the safe so that the safe does not become an object of interest to a potential thief.

From the description herein, it will be appreciated that the present disclosure encompasses multiple embodiments which include, but are not limited to, the following:

A remote access safe apparatus, comprising: (a) a container with an open interior and an access door enclosing the interior; (b) a remotely controllable latch mounted to the access door and container; (c) an access fob capable of transmitting wireless signals; (d) an access fob controller operably coupled to the remotely controllable latch, the access fob controller configured to lock or unlock the latch upon receipt of at least one fob wireless signal from the access fob; and (e) a reversible coupling configured to fix the container to a substrate.

The apparatus of any preceding or following implementation, wherein the container further comprises at least one handle mounted to an exterior surface of the container.

The apparatus of any preceding or following implementation, wherein the container further comprises a tamper alarm mounted to the container.

The apparatus of any preceding or following implementation, wherein the reversible coupling configured to fix the container to a substrate comprises: a plurality of bolts disposed through apertures in a bottom wall of the container; and a plurality of corresponding nuts; wherein access to the plurality of bolts and corresponding nuts is when the container access door is open.

The apparatus of any preceding or following implementation, further comprising: a mounting plate secured to a substrate; wherein the reversible coupling is configured to couple the container with the mounting plate to fix the container to the substrate.

The apparatus of any preceding or following implementation, the reversible coupling further comprising: a remote decoupling mechanism operably connected to the reversible coupling configured to secure or detach the container with the mounting plate upon receiving a wireless signal from the access fob; wherein the container can be detached from the mounting plate remotely without opening the container.

The apparatus of any preceding or following implementation, wherein the access fob controller further comprises a keypad for entry of an access code authorizing access to the container.

The apparatus of any preceding or following implementation, the access fob controller further comprising: a sound generator configured to produce a characteristic chirp when the latch is locked or unlocked by the access fob controller after receiving an access fob transmission.

The apparatus of any preceding or following implementation, the access fob controller further comprising a location transponder.

The apparatus of any preceding or following implementation, the access fob further comprising: a Radio Frequency Identification (RFID) Tag; wherein the fob controller will not unlock the container latch without additionally receiving an RFID signal from the access fob.

A vehicle locking safe system, the system comprising: (a) a container with a hinged lid and at least one lock and a controller operably coupled to the lock; (b) a mounting plate fixed to a structural member of a vehicle, the container mounted to the mounting plate; and (c) a wireless actuator configured to actuate the controller.

The system of any preceding or following implementation, wherein the container further comprises a tamper alarm mounted to the container.

The system of any preceding or following implementation, wherein the controller comprises: a microprocessor with programming; a transmitter and receiver; and a power system.

The system of any preceding or following implementation, wherein the controller further comprises a keypad for entry of an access code authorizing access to the container.

The system of any preceding or following implementation, the controller further comprising: a sound generator configured to produce a characteristic chirp when the latch is locked or unlocked by the controller after receiving an access transmission from the wireless actuator.

The system of any preceding or following implementation, the controller further comprising a location transponder.

The system of any preceding or following implementation, wherein the wireless actuator comprises a mobile telephone.

The system of any preceding or following implementation, wherein the wireless actuator comprises a wireless key fob with container locking and unlocking command buttons.

The system of any preceding or following implementation, wherein the wireless actuator further comprises a key fob coupling configured to join the wireless key fob for the container with a wireless entry fob for a vehicle.

A vehicle locking safe system, the system comprising: (a) a container with a hinged lid and at least one lock; (b) a mounting plate fixed to a structural member of a vehicle, the container reversibly mounted to the mounting plate; (c) a wireless actuator configured to transmit wireless signals; (d) a processor configured to receive signals from the wireless actuator; and (e) a non-transitory memory storing instructions executable by the processor; (f) wherein the instructions, when executed by the processor, perform steps comprising: (i) receiving a wireless command signal from the wireless actuator; (ii) authenticating the received wireless command signal from the wireless actuator; and (iii) executing authenticated command signals to activate or deactivate the lock.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variations thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A remote access safe system, comprising:
   (a) a container with an open interior and an access door enclosing the interior;
   (b) a remotely controllable latch mounted to the access door and container;
   (c) a remote fob comprising:
      (i) a removable safe remote portion and a vehicle remote portion;
      (ii) the removable safe remote portion capable of transmitting wireless signals for locking or unlocking the latch;
      (iii) a reversible coupling configured for connecting the removable safe remote portion to the vehicle remote portion and for removing the removable safe remote portion from the vehicle remote portion;
      (iv) wherein the removable safe remote portion comprises a safe locking button and a safe opening button;
   (d) a safe access controller operably coupled to the remotely controllable latch, the safe access controller configured to lock or unlock the latch upon receipt of at least one wireless signal from the removable safe remote portion of the remote fob; and
   (e) a reversible coupling configured to fix the container to a substrate.

2. The system of claim 1, wherein the container further comprises at least one handle mounted to an exterior surface of the container.

3. The system of claim 1, wherein the container further comprises a tamper alarm mounted to the container.

4. The system of claim 1, wherein the reversible coupling configured to fix the container to a substrate comprises:
   a plurality of bolts disposed through apertures in a bottom wall of the container; and
   a plurality of corresponding nuts;
   wherein access to the plurality of bolts and corresponding nuts is when the container access door is open.

5. The system of claim 1, further comprising:
   a mounting plate secured to a substrate;
   wherein said reversible coupling is configured to couple the container with the mounting plate to fix the container to the substrate.

6. The system of claim 5, said reversible coupling further comprising:
   a remote decoupling mechanism operably connected to the reversible coupling configured to secure or detach the container with the mounting plate upon receiving a wireless signal from the removable safe remote portion of the remote fob;
   wherein the container can be detached from the mounting plate remotely without opening the container.

7. The system of claim 1, wherein the safe access controller further comprises a keypad for entry of an access code authorizing access to the container.

8. The system of claim 1, said safe access controller further comprising:
   a sound generator configured to produce a characteristic chirp when the latch is locked or unlocked by the safe access controller after receiving an access transmission from the removable safe remote portion of the remote fob.

9. The system of claim 1, said safe access controller further comprising a location transponder.

10. The system of claim 1, said removable safe remote portion of the remote fob further comprising:
    a Radio Frequency Identification (RFID) Tag;
    wherein the safe access controller will not unlock the container latch without additionally receiving an RFID signal from the removable safe remote portion of the remote fob.

11. The system of claim 1:
    (a) wherein the access door comprises a hinged lid; and
    (b) wherein the reversible coupling configured to fix the container to a substrate comprises a mounting plate fixed to a structural member of a vehicle, said container mounted to said mounting plate.

12. The system of claim 1, the safe access controller further comprising:
   (a) a processor configured to receive signals from the removable safe remote portion of the remote fob; and
   (b) a non-transitory memory storing instructions executable by the processor;
   (c) wherein said instructions, when executed by the processor, perform steps comprising:
      (i) receiving a wireless command signal from the removable safe remote portion of the remote fob;
      (ii) authenticating the received wireless command signal from the removable safe remote portion of the remote fob; and
      (iii) executing authenticated command signals to activate or deactivate the remotely controllable latch.

13. A remote access safe system, comprising:
   (a) a container with an open interior and an access door enclosing the interior;
   (b) a remotely controllable latch mounted to the access door and container;
   (c) a remote fob comprising:
      a removable safe remote portion and a vehicle remote portion;
      the removable safe remote portion capable of transmitting wireless signals for locking or unlocking the latch;
      a reversible coupling configured for connecting the removable safe remote portion to the vehicle remote portion and for separating the removable safe remote portion from the vehicle remote portion; and
      wherein the removable safe remote portion comprises a safe locking button and a safe opening button;
   (d) a safe access controller operably coupled to the remotely controllable latch, the safe access controller configured to lock or unlock the latch upon receipt of at least one wireless signal from the removable safe remote portion of the remote fob;
   (e) a reversible coupling configured to fix the container to a substrate;
   (f) a sound generator configured to produce a characteristic chirp when the latch is locked or unlocked by the safe access controller after receiving an access transmission from the removable safe remote portion of the remote fob;
   (g) the removable safe remote portion of the remote fob further comprising a Radio Frequency Identification (RFID) Tag, wherein the safe access controller will not unlock the container latch without additionally receiving an RFID signal from the removable safe remote portion of the remote fob;
   (h) the safe access controller further comprising:
      a processor configured to receive signals from the removable safe remote portion of the remote fob; and
      a non-transitory memory storing instructions executable by the processor;
      wherein said instructions, when executed by the processor, perform steps comprising:
      receiving a wireless command signal from the removable safe remote portion of the remote fob;
      (ii) authenticating the received wireless command signal from the removable safe remote portion of the remote fob; and
      (iii) executing authenticated command signals to activate or deactivate the remotely controllable latch.

14. The system of claim 13, wherein the container further comprises at least one handle mounted to an exterior surface of the container.

15. The system of claim 13, wherein the container further comprises a tamper alarm mounted to the container.

16. The system of claim 13, wherein the reversible coupling configured to fix the container to a substrate comprises:
   a plurality of bolts disposed through apertures in a bottom wall of the container; and
   a plurality of corresponding nuts;
   wherein access to the plurality of bolts and corresponding nuts is when the container access door is open.

17. The system of claim 13, further comprising:
   a mounting plate secured to a substrate;
   wherein said reversible coupling is configured to couple the container with the mounting plate to fix the container to the substrate.

18. The system of claim 17, said reversible coupling further comprising:
   a remote decoupling mechanism operably connected to the reversible coupling configured to secure or detach the container with the mounting plate upon receiving a wireless signal from the access fob;
   wherein the container can be detached from the mounting plate remotely without opening the container.

19. The system of claim 13, wherein the safe access controller further comprises a keypad for entry of an access code authorizing access to the container.

20. The system of claim 13, said safe access controller further comprising a location transponder.

* * * * *